United States Patent [19]

Stanley

[11] 4,320,645
[45] Mar. 23, 1982

[54] APPARATUS FOR FABRICATING ELECTRICAL EQUIPMENT

[75] Inventor: Louis Stanley, Beverly Hills, Australia

[73] Assignee: Card-O-Matic Pty. Limited, Waterloo, Australia

[21] Appl. No.: 84,039

[22] Filed: Oct. 11, 1979

[51] Int. Cl.³ .................... H02K 15/04; H01F 41/06; B21C 47/00
[52] U.S. Cl. ........................................ 72/132; 29/598; 29/605; 72/148
[58] Field of Search .................. 29/598, 605, 609; 72/131, 132, 142, 146, 147, 148; 242/56.8

[56] References Cited

U.S. PATENT DOCUMENTS

| | | | |
|---|---|---|---|
| 2,085,092 | 6/1937 | Furth | 29/609 |
| 2,356,972 | 8/1944 | Chubbick | 29/605 |
| 2,357,017 | 8/1944 | Miller et al. | 29/605 |
| 2,522,238 | 9/1950 | Schild et al. | 29/605 X |
| 3,581,389 | 6/1971 | Mori et al. | 29/598 |

*Primary Examiner*—Ervin M. Combs
*Attorney, Agent, or Firm*—Ladas & Parry

[57] ABSTRACT

A punching and winding machine having a punch assembly to punch a plurality of spaced holes in a metal strip at predetermined distances along the strip, and a winding assembly to wind the punched strip into a roll so that the holes in the strip are aligned to form radially extending slots.

15 Claims, 26 Drawing Figures

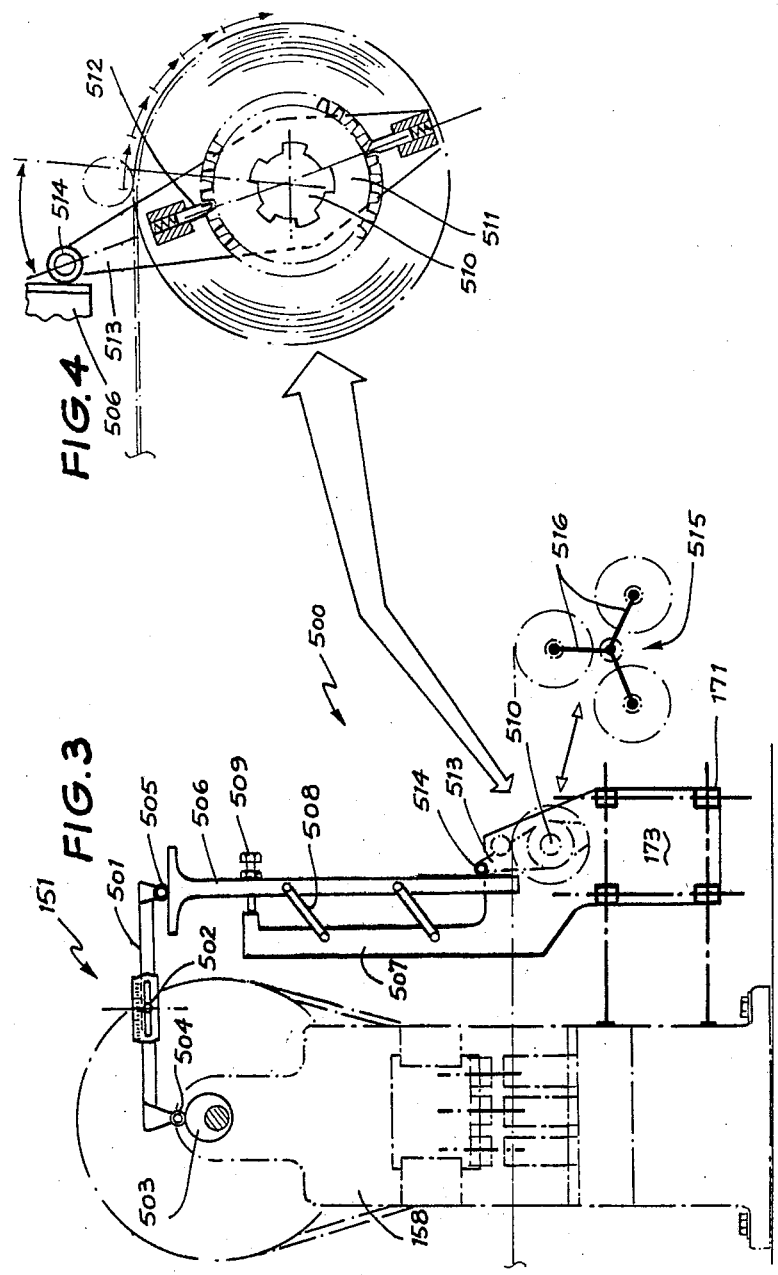

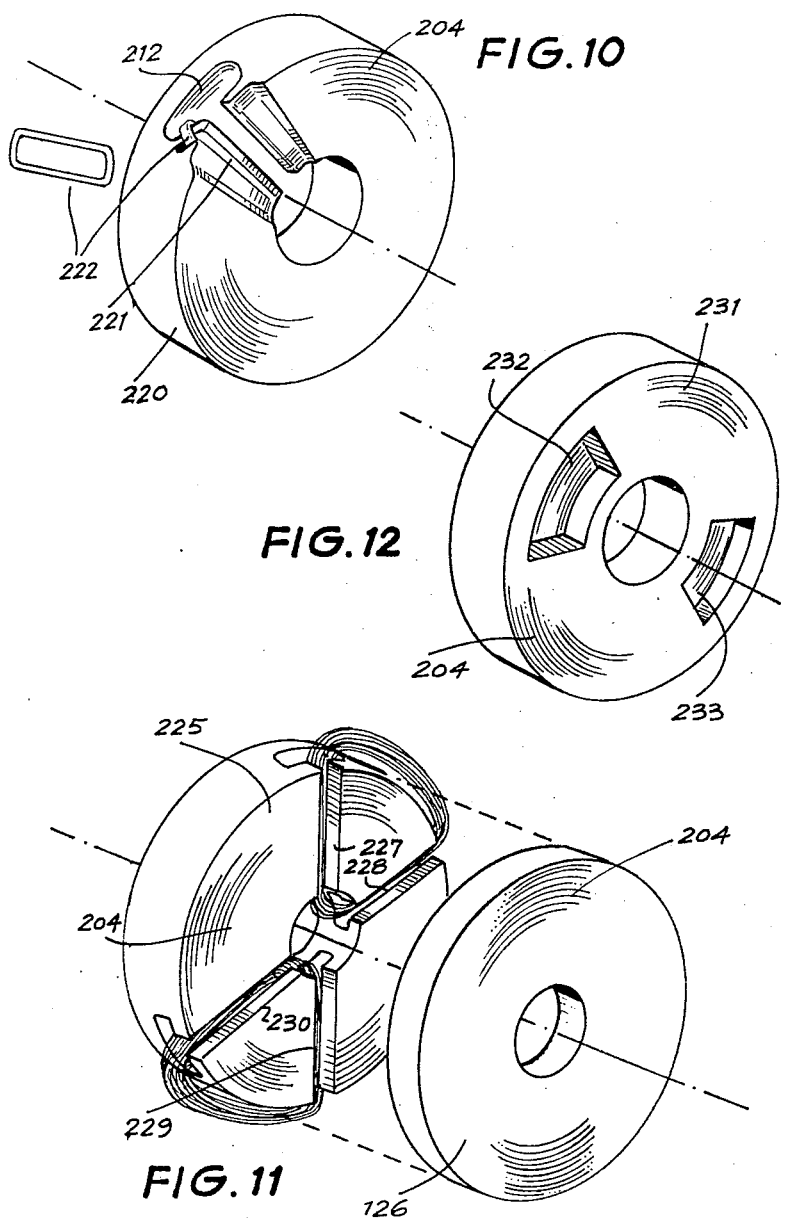

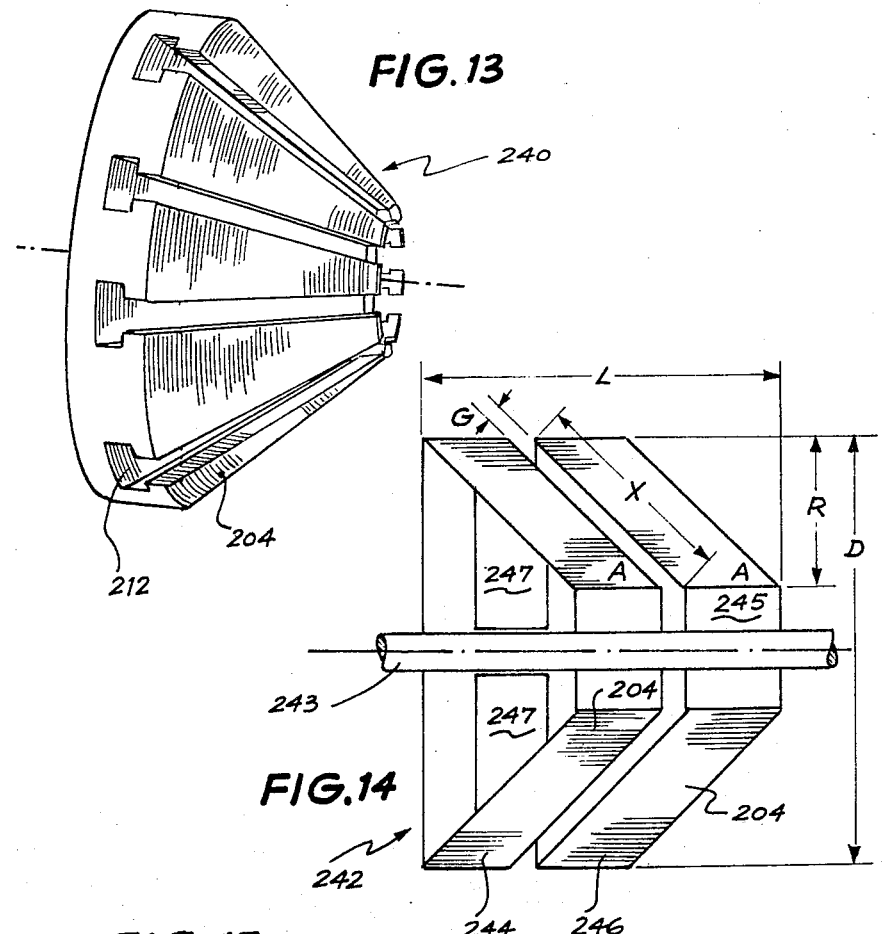
FIG. 13
FIG. 14
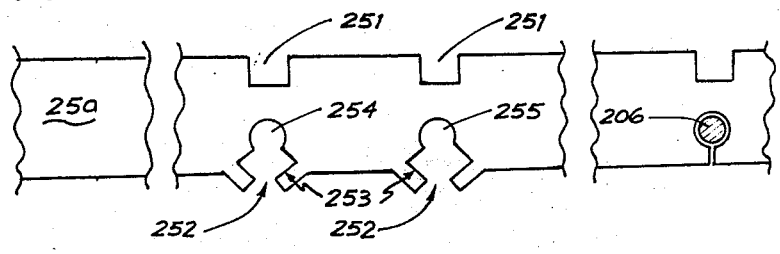
FIG. 15

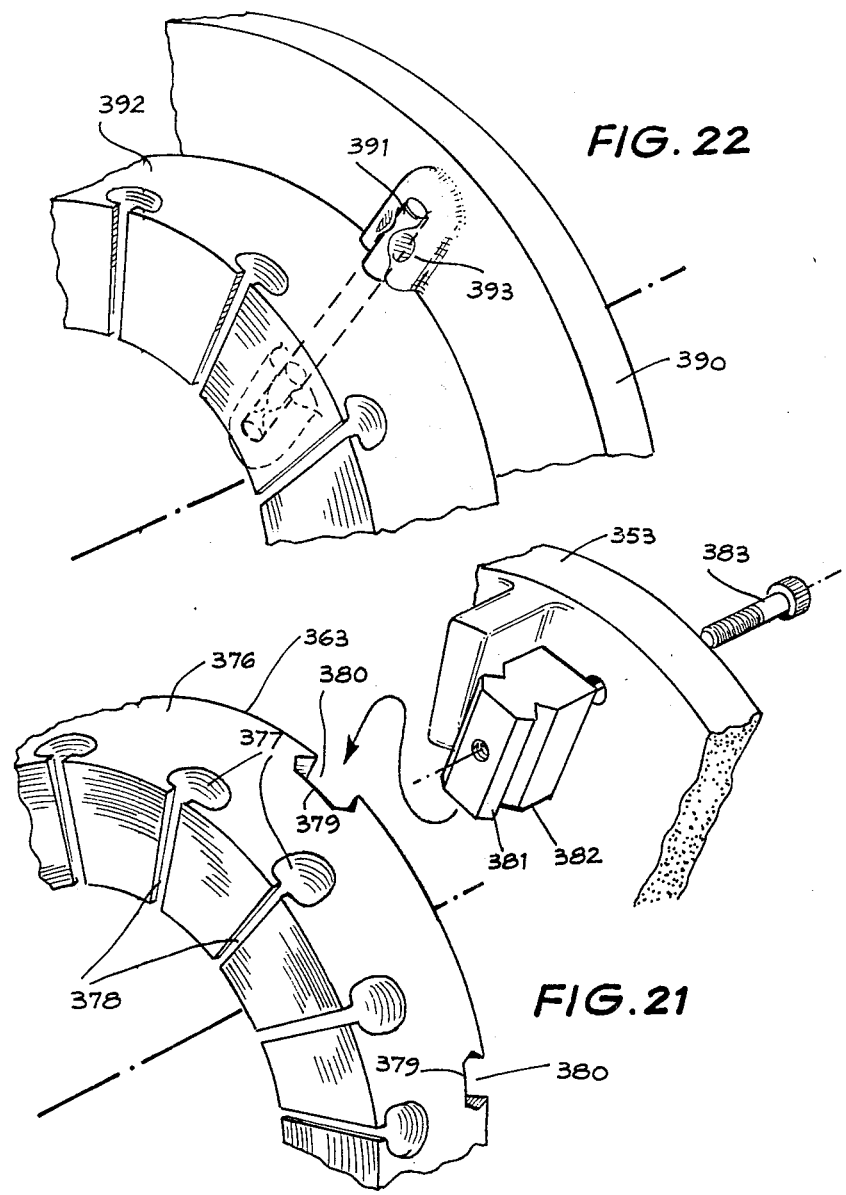

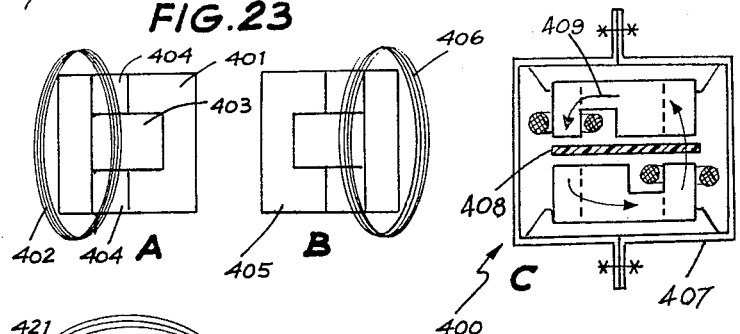
FIG. 23
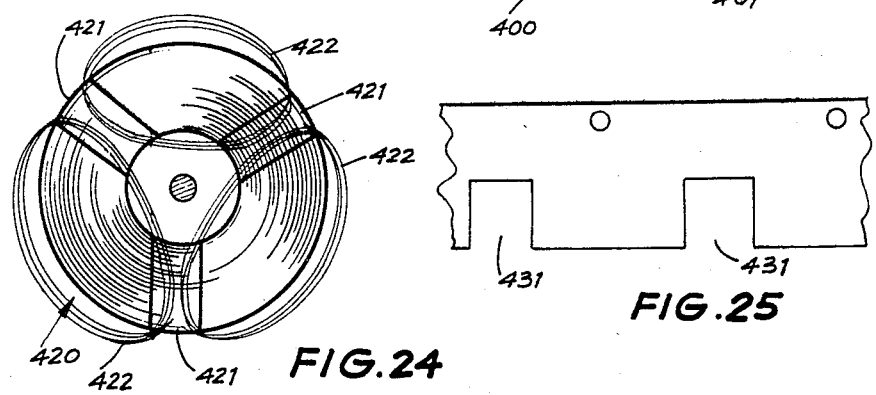
FIG. 24
FIG. 25
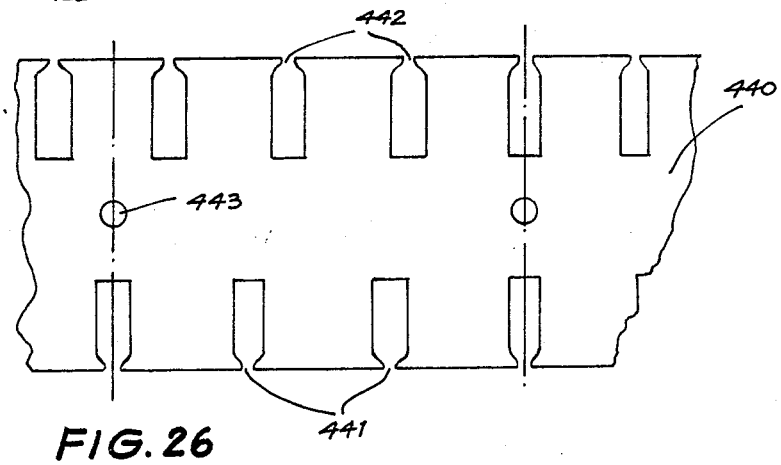
FIG. 26

APPARATUS FOR FABRICATING ELECTRICAL EQUIPMENT

Due to the desirability of using a wound roll of punched metal strip in a wide range of devices that require radially extending slots such as electromechanical devices, for example, electric motors and transformers, there is a need for a machine to wind such rolls. When the strip is being wound it is desirable to align the recesses so that on the roll the recesses combine to define a slot or passage. In particular it is desirable to align the recesses radially so as to form a radially extending slot. Additionally, it is desirable to be able to control aligning of the recesses to also form curved slots, that is slots that extended radially as well as angularly. It is also desirable to produce a roll that has internal cavities.

When winding these rolls the path of the strip approximates a spiral, however, in practice it is a closer approximation to describe each layer of strip as following a circle that is stepped at its end in order to start the next layer.

Devices have been proposed in an attempt to wind such rolls. Such prior devices are illustrated in U.S. Pat. Nos. 2,356,972 and 3,581,389. These prior devices have been unsuccessful in controlling the alignment of slots. More particularly, with reference to U.S. Pat. No. 3,581,389 there is illustrated a punching device to punch and wind a roll as described above, however, also described in that specification is a means and method by which the slots are aligned. Accordingly, it is acknowledged by the patentee in respect of this device that it could not be employed in a manner in which the arrangement of the slots could be controlled.

Now with reference to U.S. Pat. No. 2,356,972 there is illustrated a device to provide a roll as described above, however, such device would not have been successful since a gradually increasing tension force would have been applied to the strip to be punched and wound. This increase in tension force would have resulted in lack of control as the alignment of the punched holes to form a slot.

Accordingly, it is an object of a first aspect of the present invention to provide a machine which overcomes or substantially ameliorates the above disadvantages.

It is also an object of a further aspect of the present invention to provide an axial electric machine including a core being formed from metal strip wound around said axis to form a plurality of laminated layers, said strip having formed therein holes which are defined when located on the core to define a plurality of radially extending slots to receiving either conductive bands or windings.

It is an object of a first aspect of the present invention to overcome or substantially ameliorate the above disadvantages.

There is firstly disclosed herein a punch and winding machine to manufacture a roll of punched strip, said machine including a main frame, a punching assembly mounted on the main frame and adapted to receive said strip and punch holes therein at predetermined intervals along the strip as the strip is drawn through the punching assembly, a winding assembly adapted to receive the punched strip and wind it into said roll, said winding assembly including a movable frame movably mounted on the main frame, a driven shaft rotatably supported on said movable frame and about which said strip is wound so as to feed the strip through the punching assembly, said movable frame being restrained to move in a predetermined direction relative to said main frame so that the location of application of the strip to said roll moves only radially with respect to said shaft, abutment means located to abut the periphery of the roll and to cause movement of said frame in said predetermined direction, control means to cause relative movement between said punching assembly and said winding assembly in response to an increase in the diameter of the roll so as to cause an increase in the feed rate of the strip to said punching assembly beyond the feed rate determined by the diameter and rotation of said roll, bias means biasing said roll to contact said abutment means, and wherein said bias means applies a substantially constant force to said roll in biasing it toward said abutment means.

There is secondly disclosed herein an axial electric induction motor comprising a casing, a field core mounted in said casing and a rotor core co-axial with said field core and rotatably mounted in the casing; both the cores being formed of metal strip punched to have a plurality of holes which are spaced and located at predetermined positions along the strip so that when the strip is wound about a central axis the punched holes are located so as to form radially extending slots on an end face of each of the cores, at least one field winding each mounted on said field core and extending through the slots formed therein so as to be able to induce an axial magnetic field, said rotor core having radially inner and outer longitudinal generally cylindrical surfaces both overlaid with a conductive ring and a conductive band located in each of the slots and being conductively connected between the radially inner and outer conductive rings, and a shaft rotatably supported by said casing and supporting said rotor so as to be driven thereby.

There is further disclosed herein an axial inductive electric machine comprising a casing, a wound primary core and a wound secondary core co-axially mounted within the casing, both said cores being formed from metal strip punched to have a plurality of holes spaced so as to be located at predetermined positions along the strip so that when located on the cores they combine to form radially extending slots in one of the end faces of each of the cores, at least one primary winding mounted on said primary core and extending through the slots so as to be able to induce an axial magnetic field, at least one secondary winding mounted on the secondary core and extending through said slots so as to have a current induced therein by said magnetic field.

A preferred form of the present invention will now be described by way of example with reference to the accompanying drawings, wherein:

FIG. 3 is a schematic elevation of a drive mechanism for the machine of FIGS. 1 and 2;

FIG. 4 is a schematic elevation of the winding spigot and drive of the drive mechanism of FIG. 3;

Figure 1:
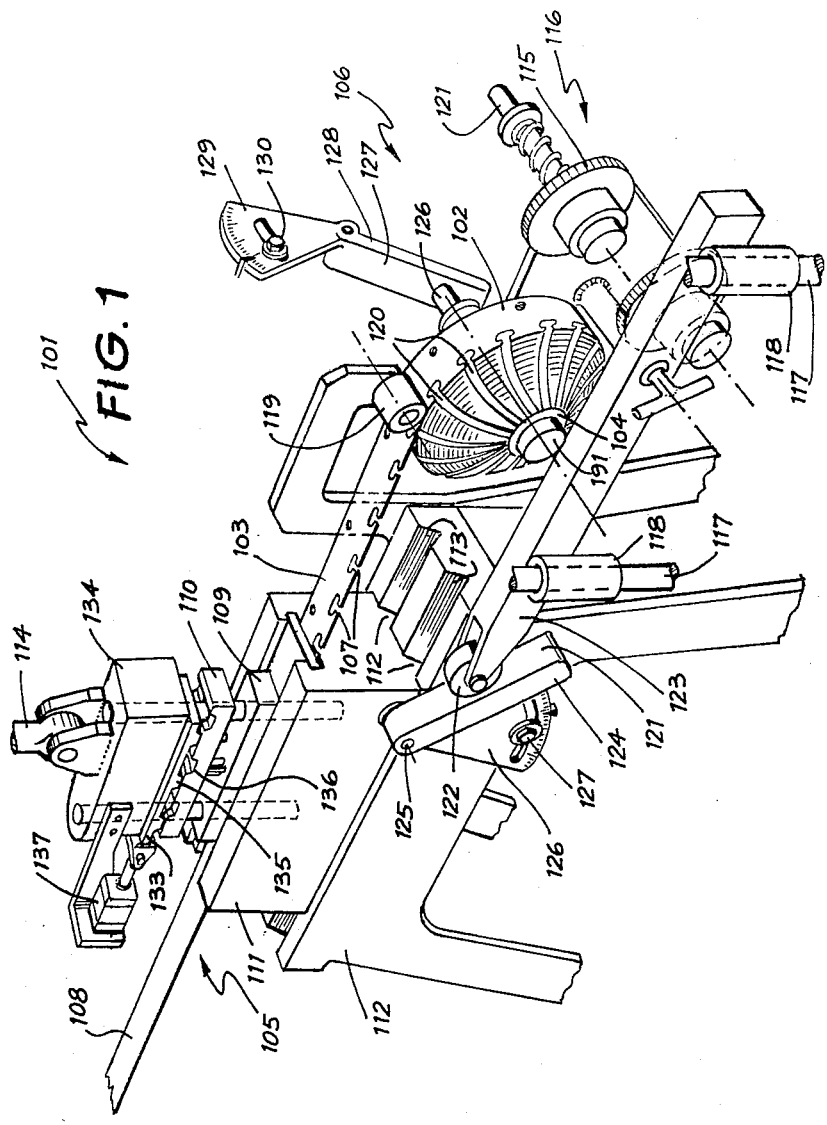
FIG. 1 is a schematic perspective elevation of a punching and winding machine.
Figure 2:
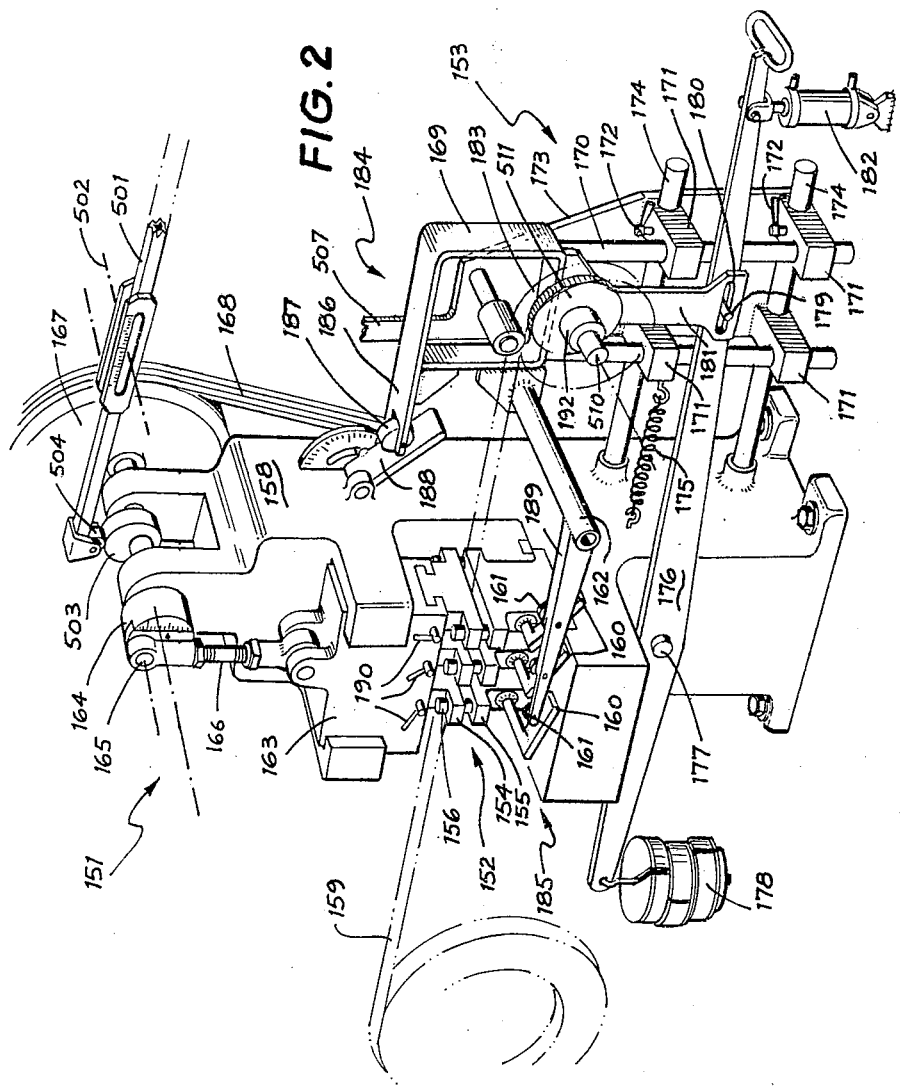
FIG. 2 is a schematic perspective elevation of a further punching and winding machine to that of FIG. 1.
Figure 5:
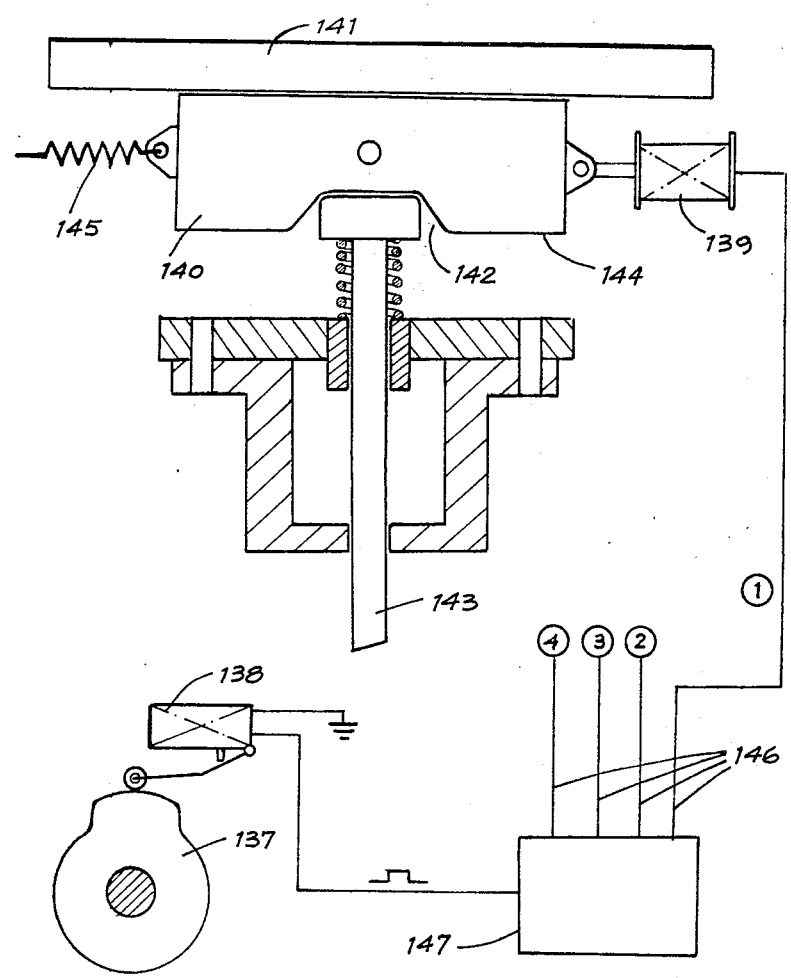
Figures 6, 7:
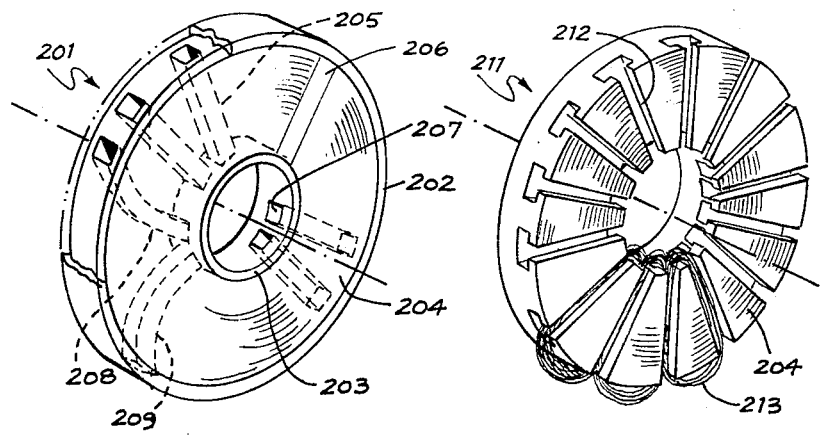
Figures 8, 9:
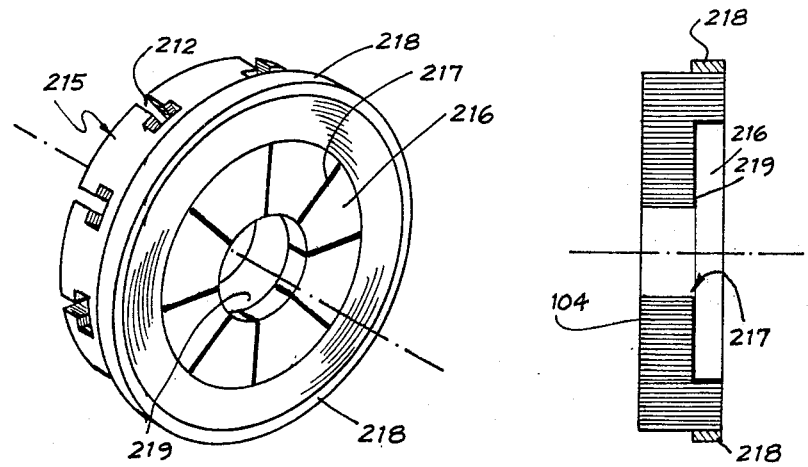
Figure 16:
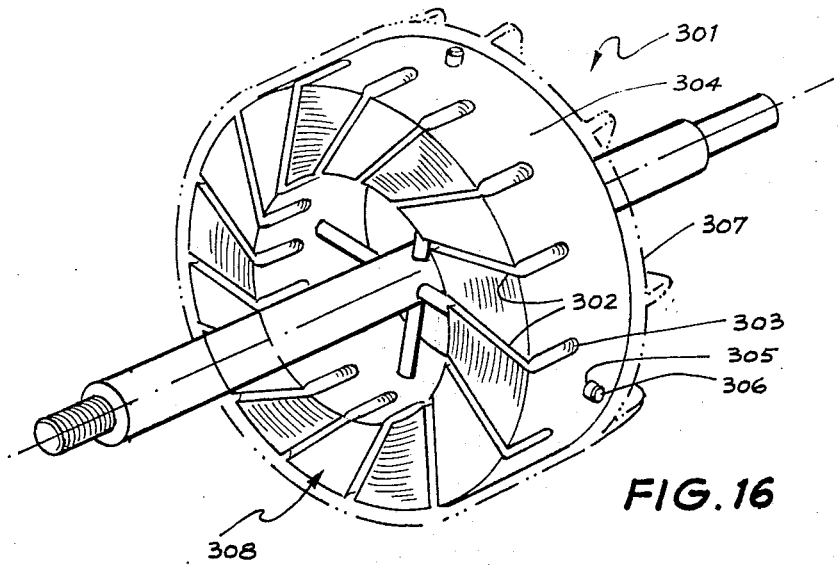
Figure 17:
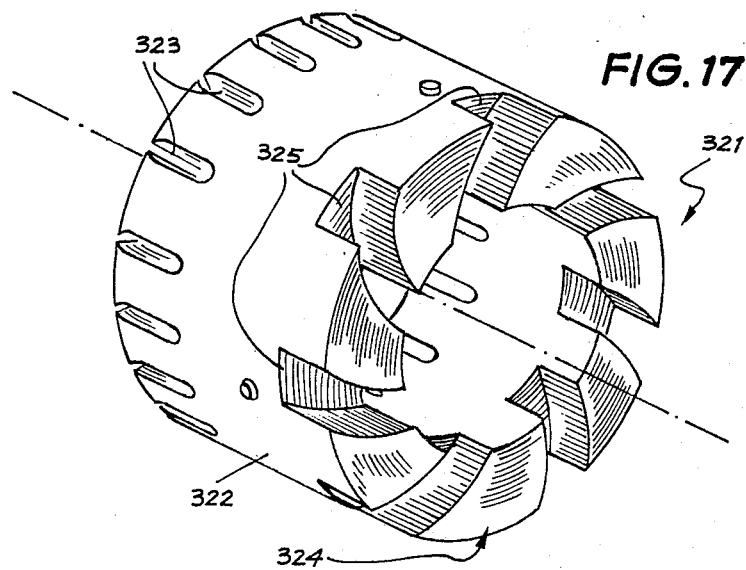
Figure 18:
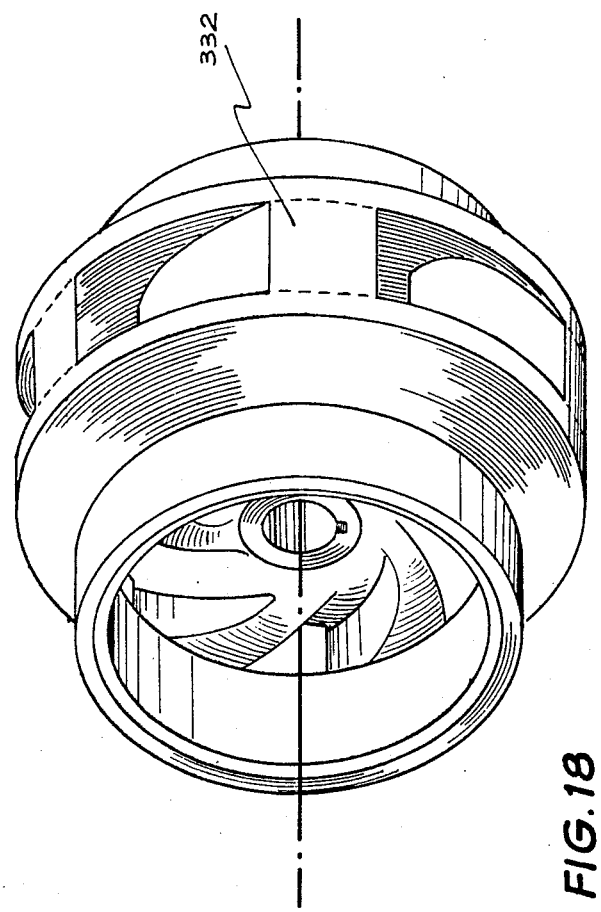
Figure 19:
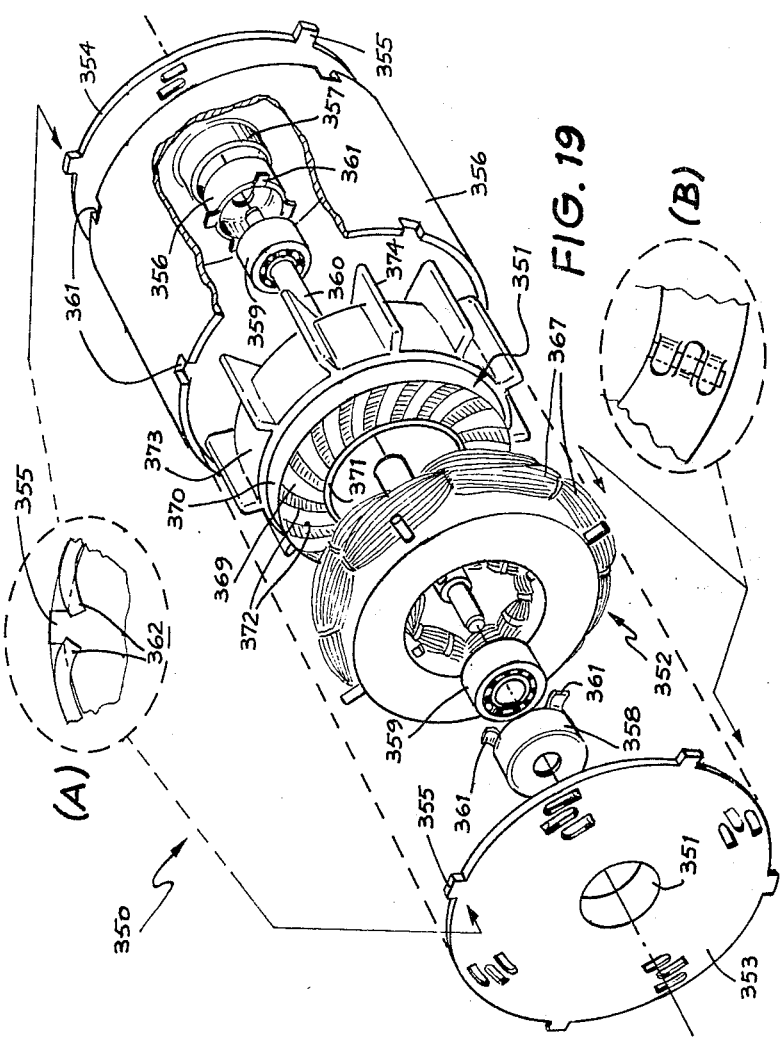
Figure 20:
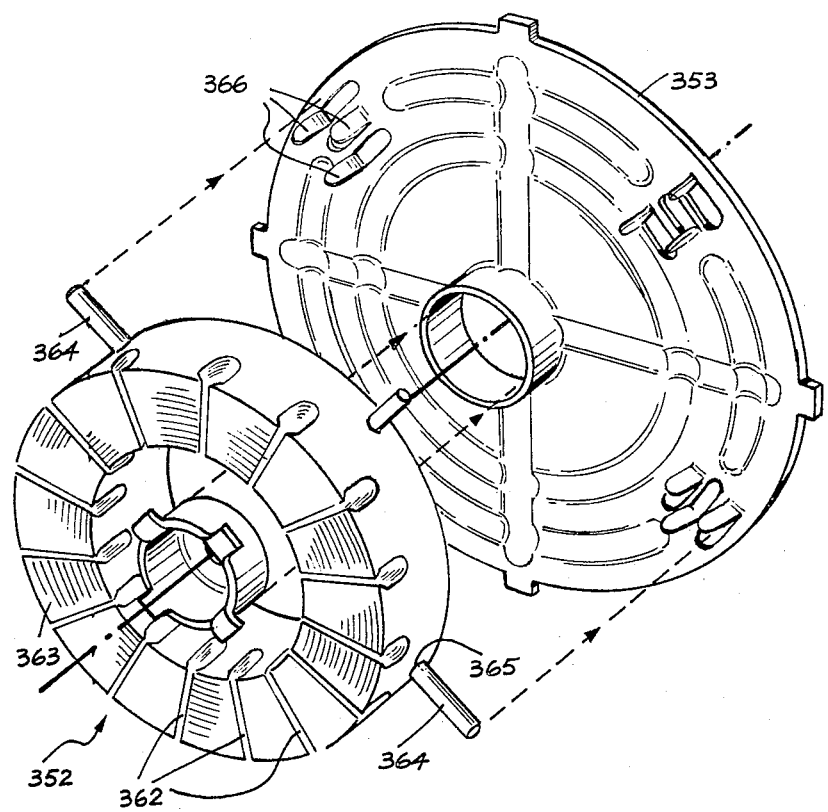

FIG. 5 schematically illustrates a punch control circuit for the machines of FIGS. 1 and 2;

FIG. 6 is a perspective view of an embodiment of an induction motor rotor of the present invention;

FIG. 7 is a perspective view of the preferred embodiment of a stator or synchronous motor rotor of the present invention;

FIG. 8 is a perspective view of the rear of a DC motor rotor in accordance with the present invention;

FIG. 9 is a radial cross section of the rotor of FIG. 5;

FIG. 10 is a perspective view of an embodiment of the stator of a shaded pole motor in accordance with the present invention;

FIG. 11 is a perspective exploded view of one side of the preferred embodiment of a two winding transformer arrangement in accordance with the present invention;

FIG. 12 is another embodiment of the windingless transformer half of FIG. 11, which embodiment permits adjustable magnetic coupling;

FIG. 13 is a perspective view of a cone-shaped rotor or stator of a further embodiment of the present invention;

FIG. 14 is a longitudinal cross sectional view of a cone-shaped induction motor of a further embodiment of the present invention;

FIG. 15 is a schematic plan view illustrating a further constructional aspect of the present invention;

FIG. 16 is a schematic perspective view of a rotor with skewed slots;

FIG. 17 is a schematic perspective view of a rotor and impeller formed integrally;

FIG. 18 is a schematic perspective view of a wound impeller;

FIG. 19 is a schematic perspective exploded parts view of an axial electric induction motor;

FIG. 20 is a schematic perspecitve view of the stator and end plate of the motor of FIG. 19;

FIG. 21 is a perspective schematic view of an alternative fastening of the stator and end plate of the machine of FIG. 19;

FIG. 22 is a perspective schematic view of an alternative fastening of the stator and end plate of the machine of FIG. 19;

FIG. 23 schematically depicts a square wound transformer;

FIG. 24 schematically depicts a 3 phase variable transformer;

FIG. 25 schematically depicts a punched strip used to form the core of the transformer of FIG. 23.

FIG. 26 schematically depicts a punched strip to be used in winding a double sided stator or rotor.

The machine 101 is adapted to manufacture a roll 102 formed by laminating a punched strip 103 by means of winding the strip 103 on a spigot 104. The machine 101, for the purposes of this description will be divided into major assemblies, the first assembly is the punching assembly 105 and the second is the winding assembly 106. The punching assembly is adapted to punch a plurality of holes 107 in the blank metal strip 108 to form the punched strip 103. The winding assembly 106 is adapted to wind the punched strip 103 to form the roll 102.

The punching assembly 105 includes a female die member 109 and a male die member 110 which are adapted to punch the holes 107 by movement of portions of the male die member 110 into the female die member 109. The male and female die members 109 and 110 are mounted on a frame 111 which is movably slidably supported by a main frame 112. The frame 111 is guided in its movement on main frame 112 by "V"-shaped slots 113 within which are received projections 112 of corresponding shape. The frame 111 is biased to move in a rightward direction relative to the main frame 112 by means of a spring (not illustrated). The male die member 110 is caused to reciprocate vertically by engagement with a crank arm 114. The crank arm 114 is pivotally attached to the plate 134 and causes the plate 148 to reciprocate vertically. The arm 114 is reciprocated by a rotatably driven crank, which is not illustrated in this particular embodiment.

Turning now to the winding assembly 106 there is depicted the spigot 104 to which is fixed the beginning of the strip 103. The spigot 104 is driven by means of a gear train (not illustrated), which gear train is co-ordinated with the reciprocation of the abovementioned crank arm 114. More particularly, the spigot 104 is driven by the ratchet wheel 115 which is engaged by means of a reciprocally movable pawl which is caused to reciprocate by connection with the abovementioned crank so that the ratchet wheel 115 moves intermittently in a clockwise direction. The ratchet wheel 115 is then connected to the spigot 104 by a gear train (not illustrated). Accordingly, the spigot 104 is caused to move intermittently in response to the reciprocation of the crank arm 114. The intermittent rotation of the spigot 104 causes intermittent longitudinal movement of the strip 103 relative to the die members 109 and 110 to thereby cause spacing of the holes 107. The ratchet wheel 115 is splined to the shaft 121 to which shaft 121 is fixed means to limit rotation of shaft 121 so that it will only rotate in a clockwise direction. Such a motion limiting device could be any known one way clutch. This is to counteract the tension in the strip 103 which would tend to cause anticlockwise rotation of the roll 102 during formation thereof. The spindle 104 is rotatably supported by a frame 116 of which there is schematically depicted eyelets 118, which receive vertical guides 117. The frame 116 is allowed to move vertically in response to the increase in diameter of the roll 102. This is to maintain the position of application of the strip 103 to the roll 102 relatively constant. By maintaining this position constant there is eliminated any undesirable variations in feed rate due to an increasing distance between the position of application of the strip 103 to the roll 102 and the die members 109 and 110. However, it should be appreciated that the frame 116 is biased to move in a vertical direction by means of a counter balance or hydraulically or compressed air operated ram which causes the outer periphery of the roll 102 to engage the roller 119. It is important in the provision of these means to bias the roll 102 to move in a vertical direction that such vertical force applied to the spigot 104 is relatively constant thereby not increasing the tension in the strip 103. A substantial variation in tension would cause distortion and stretching of the strip and loss of control of alignment of the holes 107 to form the slots 120.

The spacing between the holes 107 determines the location of the holes 107 on the roll 102, while if the holes 107 are to be aligned to form radially extending slots 120 then the distance between the holes 107 must increase as the diameter of the roll 102 increases, given a predetermined number of holes 107 on the circumference of the roll 102. Thus if the frequency of punching is constant then it is necessary to gradually increase the feed rate, which increase is achieved by the gradually increasing diameter of the roll 102 and the constant average angular velocity of the spigot 104. The feed rate of the blank strip 108 to the punching assembly 105 is governed by two factors. The majority of the feed rate results from the intermittent rotation of the drive spigot 104. The roll 102 as it increases in size causes an increase in the feed rate and this accounts for the majority of the increase in distance between the punched holes 107. However, due to the strip 103 not forming an exact spiral on the roll 102, and more particularly, only approximating a plurality of concentric circles joined by a step, it has been found that the feed rate must be incrementally increased beyond that of the increase due to the changing diameter of roll 102. In this particular embodiment this incremental increase is achieved by moving the frame 111 relative to the spigot 104. It has also been found that the incremental increase must be proportional to the diameter of the roll 102 and thus there is provided the cam surface 121 and roller 122. The roller 122 is supported by the arm 123 fixed to the frame 116. As the frame 116 moves downwardly in response to the increasing diameter of the roll 102, the roller 122 moves down and bears against the cam surface 121. This in turn causes rightward movement of the frame 111. The cam surface 121 is defined by a face of the member 124 which is adjustably fixed to the frame 111 at pivot 125. Attached to the member 124 is a calibrated adjustment plate 126 which is engaged by set screw 127 to fix the position of the member 124 and thus the angle of the cam surface 121 relative to the roller 122.

An additional advantage in employing a movable frame 111 is to support the die members 109 and 110 so that the inclination of the cam surface 121 may be varied. This enables the holes 107 to be positioned so that the slots 120 extend angularly as well as radially as can be seen in FIG. 17.

In the formation of rolls 102 of punched strip 103 it has been found that it is also desirable to provide the roll 102 with a conical configuration supplied by a sliding motion of the spigot 104 upon the shaft 191 which drives and supports the spigot 104. This driven shaft 191 is in continual driving contact with the spigot 104 by means of a spline. The spigot 104 is provided with an extension 126 which engages a cam surface 127 to cause the movement of the spigot 104. The cam surface 127 is defined by a face of the member 128 which is pivotally mounted on the main frame 112. The angle of the cam face 127 is determined by the adjustment plate 129 which is engaged by set screw 130 to fix the position of the member 128 thereby determining the conical configuration of the roll 102.

In the present arrangement the male die 110 is selectively operated by means of a slide 133 selectively adapted to engage the vertically reciprocated plate 134. In a first position the slide 133 causes vertical movement of the male die 110 by placing the abutments 135 between the male die member 132 and the vertically moving plate 134. In a second position the abutments 135 are located within grooves 136 thereby disengaging the male die member 110 from the vertical moving member 134. Movement of the slide 133 between the above two described positions is achieved by means of a solenoid 139 which solenoid 139 may be controlled either electronically or by means of a mechanical cam and microswitch activated thereby.

Now with reference to FIG. 5 this mechanical cam 137 referred to above would be synchronised with the winding assembly 106.

Again with reference to FIG. 5 the cam 137 is caused to rotate in synchronism with spigot 104 and to activate the switch 138. The switch 138 then distributes signals to any number of solenoids 139 to activate slide/s 140 by means of pulse distributor 147. This modification includes a vertically reciprocating plate 141. The slide 140 has a recess 142 within which the upper end of the male die member 143 is located if not to be activated. However, upon the slide 140 being moved so that the die member 143 no longer enters the recess 142 but engages face 144 the male die member 143 is caused to punch a strip passing beneath it. The slide 140 is caused to move between the above two positions by solenoid 139 acting against spring 145. The outputs 146 of pulse distributor 147 may be connected to other solenoids 139 to activate alternate male die members.

In FIGS. 2 and 3 there is depicted an alternative machine 151 to that of FIG. 1. The machine 151 includes both a punching arrangement 152, a winding arrangement 153. The punching arrangement 152 includes a plurality of male die members 154 and a plurality of female die members 155 coupled by means of guide rods 156 to enable vertical reciprocation of the male die members 154 relative to the female die members 155. Both the female and the male die members 154 and 155 are mounted so as to be slidable relative to the main frame 158 so as to be movable in a direction along the strip 159. The movement of the male and female die members 154 and 155 is governed by means of adjustable cam surfaces 160 engaged by cam rollers 161 which are moved in response to vertical movement of the arm 162. The male die members may be individually fixed to the frame 158 by their respective set screw 190. The male die members 154 are coupled to a vertically reciprocated member 163 which is slidably guided within the main frame 158 and is vertically reciprocated by means of crank 164 and connecting rod 165. The connecting rod 165 is eccentrically pivotably mounted on the crank 164 at pivot pin 165. The crank 164 is driven by fly wheel 167 which in turn is driven by means of belts 168 extending to an electric motor.

The winding device 153 includes a frame 169 which is allowed to move vertically by engagement of rods 170 slidably within guides 171. The winding device 153 which includes the frame 169 rotatably supports the spigot 192.

The guides 171 form part of a sub-frame 173 which is slidably supported by rods 174 fixed to the main frame 158. The rods 174 are selectively slidably received also in guides 171 to enable horizontal movement of the sub-frame 173 relative to the main frame 158. The sub-frame 173 is biased to move in a leftward direction by spring 175. The sub-frame 173 is selectively fixable to the main frame 158 by set screws 172. The frame 169 is biased to move vertically by counterbalance arm 176 being pivoted at pin 177 and having weights 178 secured to one end. The arm 176 engages by means of pin 179, slot 180 of link 181 fixed to the frame 169. Alternatively, the arm 176 may be biased to move vertically by double acting ram 182. It should be appreciated that the force applied to the frame 169 by means of arm 176 must be substantially constant in order to maintain the tension in the strip 159 relatively constant. The only variation in using a counterbalance arm 176 and weights 158 is the increase in weight of the wound roll 183.

As discussed with reference to the machine 101 of FIG. 1, in order to control the alignment of punched holes it is necessary, apart from increasing the feed rate by means of increasing the diameter of the wound roll 183, to increase the feed rate by moving the spigot 192 away from the male and female die members 154 and 155. This relative movement may be accomplished by movement control means 184 and/or movement control means 185. Either of these control means 184 or 185 may be disconnected or used in combination with the other control means to combine in causing the relative movement of the spigot 192 relative to the male and female die members 154 and 155. Control means 184 includes arm 186 extending from frame 169 and to which is attached a roller 187 to engage cam surface 188 which may be adjusted in inclination to cause varying degrees of horizontal movement of the frame 169 in response to vertical movement of the frame 169 resulting from the increasing diameter of the wound roll 183. The control means 185 includes arm 189 which is fixed to rod 162 so as to move therewith. Attached to the end of the arm 189 are the rollers 161. The rollers 161 engage cam surfaces 160 to cause relative movement between the spigot 192 and the male and female die members 154 and 155. It should be appreciated that the two control means 184 and 185 have been provided so that the machine 151 may be used to wind large diameter rolls 183. The machine 101 of FIG. 1 by only being provided with the one control means is only suitable to wind relatively small diameter rolls. It should further be appreciated that by manipulation of the various set screws 172 and 190 together with the cam surfaces 188 and 160 and their respective rollers 187 and 161, the machine 151 may be configured to punch a wide variation of holes in varying locations.

Further to the above the machine 151 could be adapted to have a slide arrangement similar to that of FIG. 1 and a control mechanism according to FIG. 5 to further increase its range of operation.

Now with reference to FIGS. 3 and 4, the machine 151 has a winding drive mechanism 500 which includes a rocker arm 501 pivotally mounted on the main frame 158 by pin 502. One end of the arm 501 engages cam 503 by means of a roller 504 so as to be angularly reciprocated. The other end of arm 501 has a roller 505 which engages vertically movable member 506 to cause vertical reciprocation thereof. However, member 506 is pivotally attached to base 507 by links 508 so that in moving vertically, the member 506 also moves horizontally. The member 506 is limited in its movement by adjustment screw 509. The member 506 is attached to sub-frame 173 so as to be horizontal therewith. Horizontal movement of the member 506 is transferred into rotary motion of the shaft 510 by ratchet wheel 511 and pal 512. The pawl 512 is rotated about shaft 510 by angular reciprocation of arm 513 which by means of roller 514 is caused to reciprocate by member 506. The ratchet wheel 511 is splined together with spigot 192 to shaft 510.

The spigot 192 may be one of many spigots mounted on a rotatable turret 515 having arms 516 to support the spigots. In this manner the manufacture of rolls may be quickened.

In a further aspect the present invention relates to axial electric machines both rotary machines and transformers. In FIG. 6 the rotor of an AC induction machine of one embodiment of the present invention is illustrated. The rotor 201 comprises two concentric conductive bands 202 and 203 between which is located a spiral 204 of laminated permeable material. The spiral 204 is wound from strip lamination as before and is stamped prior to winding so as to produce a plurality of radially extending apertures 205 passing through the spiral 204. Within each aperture 205 is a conductive rod 206 which is firmly secured in electrical conduction with the bands 202 and 203 by means such as brazing as indicated at 207.

The stamping of the lamination material prior to winding of the spiral 204 may be adjusted as described hereinbefore in order to produce a curved aperture 208 or 209, direction and degree of curvature being adjusted to take into account the distortion of the magnetic fields of the motor caused by rotation of the rotor. A portion of the outer conductive band 202 is not illustrated in FIG. 3 in order to more clearly show the radial nature of the apertures 205.

FIG. 7 illustrates a core 211 which could be the stator of an AC induction motor, an AC synchronous motor, or a DC motor. In addition, FIG. 7 could depict the wound rotor of a synchronous motor of one embodiment of the present invention. The spiral 204 of the core of FIG. 7 is stamped and wound as before so as to provide a plurality of open-edged slots 212, some of which are shown with windings 213 in place. The slots 212 open towards the air gap of the core 211 and therefore in FIG. 7 it is the forward face of the core 211 which is illustrated.

However, in FIG. 8 it is the rear face of the rotor of a DC motor in accordance with an embodiment of the present invention which is illustrated. The forward face of the DC rotor 215 which faces the air gap of the machine contains a plurality of slots 212 as described above in connection with FIG. 7. However, the rear face of the rotor 215 houses a plurality of commutator segments 216 which are insulated from each other by means of insulation 217. Also insulation 219 insulates the inner faces of the commutator segments 216.

As seen in FIG. 9, the width of the strip of lamination making up the spiral 204 is reduced for small radii in the spiral 204 thereby creating an annular recess within which the commutator segments 216 may be retained. However, for large radii in the spiral 204 a full width of strip lamination is used so that the peripheries of the commutator segments 216 are retained by means of at least several layers of strip lamination. In consequence, as the rotor 215 rotates, the centrifugal force applied to the commutator segments is insufficient to cause any movement of the commutator segments 216 since they are retained in place by the peripheral layers of the spiral 204.

Therefore the rotor 215 may be rotated at extremely high speed without the commutator disintegrating as is the case in conventional DC machines. If even higher rotational speeds are required, a reinforcing ring 218, of high strength material such as steel, may be heat shrunk around the periphery of the spiral 204 to further retain the commutator segments 216. It will be apparent to those skilled in the art that the ability to rotate as a commutator carrying rotor at high speeds without the rotor undergoing disintegration due to the centrifugal forces experienced thereby, represents a substantial departure from the prior art.

The stator 220 of the preferred embodiment of a shaded pole motor according to the present invention is illustrated in FIG. 10. The stator 220 includes a plurality of slots 212 formed in the spiral 204 as before, however, only one slot 212 is illustrated in FIG. 10. Windings 213 (not illustrated in FIG. 10) are provided in each of the slots 212 in the manner indicated in FIG. 4. Adjacent each slot 212 is a groove 221 which carries a shading winding 222 which in FIG. 10 is illustrated immediately prior to insertion in to the groove 221. A change in flux passing through the shading winding 222 induces a current in the shading winding 222 of a direction which opposes any change in the flux passing through the shading winding 222. Therefore there is both a spatial and temporal change in the magnetic flux passing through the radial air gap of the motor, which change in flux provides the starting torque in known fashion.

The present invention also relates to transformers because an AC induction motor may be considered to be a transformer having the secondary winding substantially short circuited and also rotatable relative to the primary winding contained on the stator. Illustrated in FIG. 11 are the two halves 225 and 226 of a single phase transformer. The half 225 is formed from a spiral 204 as before and includes four slots 227 to 230 inclusive. For each phase the primary winding must be divided into two windings, one winding being located in slots 227 and 228 whilst the other winding is located in slots 229 and 230. The two windings which are connected in series to form the primary winding preferably have equal numbers of turns but are wound in opposite senses so as to induce a flux pattern which passes from the one half 225 to the other half 226 of the transformer. The secondary winding can be wound as a single winding located in only one of the two pairs of slots, however, where a centre tapped secondary winding is required, it is particularly desirable to wind one half of the secondary winding in slots 227 and 228 and wind the other half of the secondary winding in slots 229 and 230. In this way an easy physical and electrical balance is achieved.

The other half 226 of the transformer is easily fabricated from an unpunched or unstamped strip of lamination material wound as a spiral 204 as before but generally of narrower width than that required for half 225. The two halves 225 and 226 of the transformer may be placed together without any appreciable air gap or may be actually spaced from each other so as to provide an annular air gap, should an air gap be required. The two halves 225 and 226 of the transformer may be retained together by means such as lug(s) on one half which press fit in corresponding slot(s) on the other half.

It will be apparent to those skilled in the art that the transformer construction described above provides particularly good protection against leakage flux since substantially all the windings are enclosed by permeable material with the exception of the exposed interior and exterior ends of the windings. Therefore the transformer construction of the present invention finds particular application for high frequency isolation transformers and other high frequency transformers required for communications equipment since leakage of magnetic flux at high frequencies is a serious problem because of the interference caused thereby.

A variation to the transformer arrangement described above is illustrated in FIG. 12 which shows another form of the other half 231 of the transformer of the described embodiment. The other half 231 is formed from a spiral 204 as before but which is stamped to provide two recesses 232 and 233 which are preferably segmental as illustrated.

Whereas the other half 226 of FIG. 8 is fixed or stationary relative to the half 225, the transformer half 231 of FIG. 9 is mounted for rotation relative to the transformer half 225 of FIG. 8 by any convenient means in order to provide variable coupling between the windings of the half 225. Thus when the recesses 232 and 233 are positioned above the windings of the half 225 there will be relatively low coupling between the two windings, whereas when the recesses 232 and 233 are positioned intermediate the two windings there will be substantially unitary coupling.

Accordingly, this embodiment of the present invention finds application in welding equipment, for example, where the output of the secondary winding is required to be adjusted in order to accommodate different natures of the jobs to be welded. Altering the reluctance of the flux path linking the primary and secondary windings also adjusts the amount of energy able to be transferred between the two windings and therefore adjusts the output of the welder as required.

In a further modification, a transformer in accordance with the embodiment of FIG. 11, can be constructed so as to have an adjustable output by mounting the other half 226 to permit axial movement away from and towards the half 225 to adjust the substantially uniform air gap between zero and a predetermined maximum. Axial movement may be achieved by having the other half 226 internally threaded and mounted on a threaded axial support. Alternatively, the centres of the two halves can be formed into circular inclined surfaces with the half 226 being rotatable relative to the half 225. Thus rotation produces a cam action between the inclined surfaces which increases the air gap spacing.

A cone-shaped rotor or stator in accordance with a further embodiment of the present invention is illustrated in FIG. 13. The permeable core 240 illustrated in FIG. 13 could be for the stator of an AC induction motor, an AC synchronous motor or a DC motor and could also be for the rotor of an AC induction or synchronous motor. The core 240 is wound from a spiral 204 as before, however, each layer of the spiral 204 is moved a small distance to one side relative to the immediately preceding layer so that a generally cone-shaped core is produced. It will be seen that the face of the core 240 presented to the eventual air gap of the machine, instead of comprising a plane annulus as in FIG. 7, now comprises a truncated cone.

The actual air gap surface includes a plurality of small steps formed by the sideways displacement of each layer of the lamination material in the spiral 204. This displacement is preferably formed by pressing a flat spiral 204 into the cone shape after the spiral 204 has been wound. Slots 212 as in FIG. 4 are also formed in the core 240. It will be apparent to those skilled in the art that the slots 212 may be formed in either conical face of the core 240.

FIG. 14 illustrates a longitudinal cross-section through an embodiment of an electric motor in accordance with the present invention using a cone-shaped stator and rotor generally similar to that illustrated in FIG. 13. Such a motor 242 is preferably an induction motor and comprises a shaft 243 to which a rotor 244 is connected. One end of the shaft 243 is carried in a bearing 245 mounted within the stator 246. The other end of the shaft 243 may be either unsupported, or supported by means of a further bearing (not illustrated).

Both the rotor 244 and stator 246 are formed from a spiral 204 which is deformed by lateral displacement of each successive layer of the spiral in the manner illustrated in FIG. 10. The cone angle A of both the rotor 244 and the stator 246 is identical so as to produce a uniform air gap G between the rotor 244 and stator 246. The layers of the deformed spiral 204 may be retained in position by any convenient means such as welding along the face of each cone which does not form one face of the air gap G. The generally annular volume 247 contained within the cone formed by the rotor 244 is available for use by ancillary equipment such as a centrifugal switch in the case of a capacitor start induction motor.

It will be apparent to those skilled in the art that the "radial" length X of the air gap is very much longer than the radius R of the corresponding air gap of a motor having an axial air gap and identical diameter. Therefore, the total volume of the air gap G of the motor of FIG. 14 is increased relative to the volume of the air gap of a motor having a stator as illustrated in FIG. 7, for example, and having the same external diameter. In consequence, a motor of increased power may be manufactured using substantially the same material and retained within the same external diameter. Therefore where axial length L is not an important consideration, great savings in weight and material cost may be made by utilizing the cone shaped motor configuration as illustrated in FIGS. 13 and 14. Furthermore, the increase in axial length L need not result in greater overall length for the entire motor since use may be made of the available space, as indicated by volume 247, to house ancillary equipment, switch gear, starting capacitors, centrifugal switches, and the like.

In FIG. 15, stages in one embodiment of the method of the present invention are illustrated in schematic plan view to illustrate steps in a preferred method of forming the induction motor rotor of FIG. 6.

A strip 250 of lamination steel which is slightly wider than the intended thickness of the rotor is punched or stamped as described above, if necessary using two or more punches and dies, to substantially simultaneously form a fan slot 251 of generally rectangular shape and a conductor slot 252.

The fan slots 251 are formed on the face of the eventual rotor opposite to the air gap face and form a generally radial pattern of ridges and slots which can be shaped in a manner similar to that of conventional cast rotor fan blades. In this way a fan for the rotor and motor is simultaneously formed during the steps of rotor fabrication.

The conductor slots 252 are each formed with two ears 253 which open outwardly from the remainder of each conductor slot 252. The remainder of each conductor slot 252 comprises a generally semi-circular portion 254 and a lozenge shaped portion 255.

When the strip 250 has been punched and wound into the spiral 204, the open conductor slots 252 are aligned to form radially extending grooves or slots. A preformed conductive member such as conductive bands 202 and 203 and rods 206 is then inserted into the slots 252 so that the rods 206 are located in the semi-circular portion 254 of the slots 252 and the conductive bands 202 and 203 are positioned as illustrated in FIG. 6.

In order to retain the conductive member within the slots 252, the rotor is pressed to bring the ears 254 in end-to-end abutment and close the lozenge shaped portion 255 as illustrated in FIG. 15. At this time the rotor may also be pressed into the cone configuration illustrated in FIGS. 10 and 11.

The preformed conductive member may be prefabricated from bands 202 and 203 to which rods 206 are brazed, cast as a single unit, or formed from one or more layers each stamped from sheet material. Alternatively the preformed conductive member can be formed from pre-wound coils, or from printed circuits.

Now with reference to FIG. 16 there is depicted a core 301 wound on the machine 101 or 151 of FIGS. 1 and 2. The core 301 is of generally cylindrical shape and is provided with a plurality of radially and angularly extending slots 302. The slots 302 are formed by the alignment of holes 303 punched in the strip 304 wound to form the core 301. Additionally, there is punched in the strip 304 a plurality of holes 305 which are aligned to provide a radially extending passage to receive pins 306. The pins 306 are provided to retain the core 301 in a wound condition. The core 301 is adapted to be used in an axial electric machine and more particularly is adapted to be used for the field windings of an axial induction motor. The core 301 has then cast around it a casing 307 which would include metal strips located in slots 302. The casing 307 would not cover the face 308 of the core 301.

There is depicted in FIG. 17 a wound core 321 which is adapted to be used as the rotor of an axial induction machine, which rotor is integrally formed with an impellar 324 of a fluid pump. In this particular instance the core 321 is formed by winding a strip 322 punched and wound on the machine 101 or 151 of FIGS. 1 and 2. The core 321 is provided with radially extending slots 323 to receive conductive bands to thereby form, in conjunction with the core 321, a rotor. The core 321 is also provided with a plurality of radially and angularly extending slots 325 which are adapted to accelerate a fluid in a housing to thereby provide the impellar 324 of a fluid pump.

In FIG. 18 there is depicted an impellar 331 of intricate shape and configuration and which can be formed by winding a punched strip 332 on the machine 101 or 151 of FIGS. 1 and 2. It should be appreciated that with reference to FIGS. 17 and 18 that if the impellars are integrally formed with rotors then such impellars may be located within a fluid reservoir with no direct communication apart from an electric field to the stator of the axial electric motor. Accordingly, the impellar may be located in the interior of the liquid reservoir and the stator on the exterior. The arrangement would operate efficiently providing the tank defining the liquid reservoir was not of steel material.

In FIG. 19 there is depicted an axial induction electric motor 350 which has a rotor 351 and stator 352 which have wound cores 363 and 369 formed by the machine 101 or 151 illustrated in FIGS. 1 and 2. The motor 350 includes end plates 353 and 354 which are of generally planar configuration and have radially extending lugs 355 which engage the casing 356 to form an enclosure for the motor 350. The end plates include cylindrical portions 357 provided to engage the bearing caps 358 which receive the bearings 359. The bearings 359 rotatably support the shaft 360 upon which the rotor 351 is mounted. The bearing caps 358 are provided with radially extending lugs 361 to limit movement of the bearing caps 358 in an axial direction into the cylindrical portions 357. Additionally, the bearing caps 358 upon the bearing 359 being located wherein could be partly radially inwardly deformed to prevent easy removal of the bearing 359 from within the cap 358. The casing 356 is provided with slots 361 within which are received the lugs 355 as illustrated in the insert A of FIG. 19. More particularly, with reference to insert A of FIG. 19, it can be seen that the slots 361 are provided with radially deflectable parts 362 which may be bent radially inwardly to engage the outer planar surface of the end plates 353 and 354 to secure the end plates 353 and 354 to the casing 356.

Now with reference also to FIG. 20 there is depicted the end plate 353 to which is to be fixed the stator 352. The stator 352 comprises a field core 363 formed by the winding process hereinbefore described. The core 363 is held in position by being mounted on the end plate 353 by means of radially extending pins 364 located in the holes 365 in the wound strip. The holes 365 are aligned so as to define a radially extending passage to receive the pins 364. The pins 364 are engaged by deformation of the lugs 366 around the pins 364, as can be seen in the insert B of FIG. 19. The stator 352 is formed by looping the field windings 367 through the slots 368 formed in the field core 363.

The rotor 351 includes a rotor core 369 which is formed from a wound punched metal strip and is manufactured by the machine and method as hereinbefore described. Fixed to the core 369 is an outer conductive ring 370 and an inner conductive ring 371 joined by radial conductive bands 372. The bands 372 are located in slots formed in the core 369. Located around the outer conductive ring 370 is a fan element 373 which includes radially extending fins 374 for cooling in that they cause air movement within the casing 356. The casing 356 of the motor 350 is formed from sheet metal bent back upon itself so that its longitudinal edges are joined to thereby form a cylinder. The longitudinal edges may be provided with a plurality of dove-tails which are interlocked to thereby eliminate the use of any threaded fastening means. In forming the casing 356 the dove-tailed longitudinal edges are overlapped and subsequently pressed to thereby deform the metal in that region to form a secure attachment.

Now with reference to FIG. 21 there is depicted the core 363 of the stator 352 of FIG. 19. However the fastening means of this particular illustration have been altered. The core 363 is formed from the punched strip 376 within which are punched a plurality of holes 377 to form the radially extending slots 378. Also punched in the strip 376 are a plurality of holes 379 aligned so as to form radially extending slots 380. The slots 380 are of a dove-tail cross-section and are adapted to engage the dove-tail portion 381 of the fastening means 382 which are threadably engaged by bolts 383 to secure the fastening means 382 and accordingly the core 363 to the end plate 353.

In FIG. 22 a further alternate fastening means is illustrated. The end plate 390 is adapted to engage pins 391 to secure stator 392 to the plate 390. The plate 390 has deformable parts 393 to engage the pins 391.

Turning now to FIG. 23 parts A, B and C there is depicted a square or rectangular transformer 400 which is wound from punched metal strip. In part A there is illustrated the primary core 401 and primary winding 402. The core 401 is wound about the longitudinal axis of the passage 403, which axis extends normal to the plane of the drawing. The strip which forms the core 401 is punched so as to have a plurality of holes which align to form passages 404 through which the winding 402 passes. In part B of FIG. 23, there is depicted the secondary core 405 and secondary winding 406. The core 405 is identical to core 401. The two cores 401 and 405 are located within the housing 407 of part C of FIG. 23 and are abutted so as to have a common longitudinal axis. Located between the two cores 401 and 405 is a sheet of insulation 408 to prevent any shorting should it occur. It should be appreciated that the flux generated by the primary coil 402 passes by way of a loop in the direction indicated by the arrows 409. The voltage output of the secondary winding 406 may be reduced by displacing the secondary core 405 from the position depicted in part C by 90° about the longitudinal axes of the cores 401 and 405. This effectively reduces the flux passing through the secondary coil.

In FIG. 24 there is illustrated the primary winding of a three phase transformer. The primary core 420 is formed of metal strip wound around the longitudinal axis of the core 420. The strip is punched so as to have a plurality of holes which are aligned so as to form radially extending slots 421 through which the winding 422 passes. The secondary core would be of identical construction and wound abut the end face of the primary core 420 illustrated, so as to be co-axial therewith. The voltage output of the secondary winding may be varied between zero and a maximum by rotating the primary core 420 relative to the secondary core about their common longitudinal axis.

FIG. 25 illustrates a punched strip 430 used to form the transformer of FIG. 24. The strip is punched with holes 431 which are aligned to form the slots 421. The holes 431 are punched and aligned to form a passage to receive a securing pin.

FIG. 26 illustrates a punched strip 440 used to form a double sided rotor or stator. The strip 440 has two sets of holes 441 and 442 which are aligned when the stator or rotor is wound to form radially extending slots. The holes 443 are punched and aligned to receive a securing pun to hold the would stator or rotor in a wound condition.

Further to the above, in the production of induction motors the windings employed could be yoke windings or alternatively wound separately and applied to the wound core. Additionally the motors could be formed with any number of poles and particularly large pole motors having in the magnitude of 700 poles. Such large pole motors would be particularly advantageous in the production of turntables for the rotation of records in sound reproduction.

What I claim is:

1. A punch and winding machine to manufacture a roll of punched strip, said machine including a main frame, a punching assembly mounted on the main frame and adapted to receive said strip and punch holes therein at predetermined intervals along the strip as the strip is drawn through the punching assembly, a winding assembly adapted to receive the punched strip and wind it into said roll, said winding assembly including a movable frame movably mounted on the main frame, a driven shaft rotatably supported on said movable frame and about which said strip is wound so as to feed the strip through the punching assembly, said movable frame being restrained to move in a predetermined direction relative to said main frame so that the location of application of the strip to said roll moves only radially with respect to said shaft, abutment means located to abut the periphery of the roll and to cause movement of said frame in said predetermined direction, control means to cause relative movement between said punching assembly and said winding assembly in response to an increase in the diameter of the roll so that the feed rate of the strip to said punching assembly is determined firstly by the diameter and rotation of said roll, and secondly by the relative movement between the punching and winding assembly, said control means including a first part attached to said movable frame so as to move therewith in said predetermined direction, and a second part attached to the punching assembly or main frame and operatively associated with said first part so as to cause said relative movement in response to movement of said first part in said predetermined direction, bias means biasing said roll to contact said abutment means, said bias means applying a substantially constant force to said roll in biasing it toward said abutment means, and winding drive means for said shaft to cause intermittent rotation thereof, punch drive means for said punching assembly, and co-ordination means coupling said winding drive means and said punch drive means so that said winding drive means causes rotation of said shaft in between punching operations.

2. The machine of claim 1, wherein the first and second parts of said control means include a cam surface attached to either said punching assembly or movable frame, an engaging member attached to the other of said punching assembly or movable frame and positionable to engage said cam surface to cause the relative movement between said punching assembly and said movable frame.

3. The machine of claim 1, wherein said co-ordination means includes a common drive member for said punching assembly and said winding drive means so that the frequency of punching operations remains constant relative to the average speed of rotation of said shaft.

4. The machine of claim 1, wherein said punching assembly includes a male and female die member, a male die support member supporting said male die member and being movably mounted on said main frame for reciprocation in a direction normal to the plane of the strip adjacent said female die member, and wherein said male die member is movably supported by said support member so as to be movable in a direction along said strip while being reciprocated thereby, said female die member being movably supported by said main frame so as to also be movable in a direction along said strip, and further including linkage means coupling said male and female die members so that they move together along said strip, and wherein said control means governs the movement of the male and female die members along the strip to cause the relative movement between the punching and winding assemblies.

5. The machine of claim 1, wherein said movable frame is mounted on guides so as to move in a second direction normal to said predetermined direction and the axis of said shaft in response to the increasing diameter of said roll so as to cause the relative movement between the punching and winding assemblies, and wherein said control means further includes a third part fixed to said movable frame and operatively associated with said main frame so as to determine the rate of movement of said movable frame in said second direction in response to the increase in diameter of said roll.

6. The machine of claim 1, wherein said bias means includes a lever pivoted intermediate its ends, force means to apply a substantially constant force to one end of the lever, and wherein said lever at its other end bears against said movable frame to bias it against said abutment means.

7. The machine of claim 6 wherein said force applying means is a weight.

8. The machine of claim 1, wherein said bias means includes a ram which is operated by a fluid under pressure.

9. The machine of claim 1, further including a hollow cylindrical base coaxially slidably mounted on said shaft and upon which said strip is wound, said base being in driving engagement with said shaft and movable longitudinally thereof, and conical control means to move said base longitudinally of said shaft so that said roll is formable with substantially conical end faces.

10. The machine of claim 9, wherein said conical control means is a cam surface adapted to engage said base to move same in response to movement of said movable frame in said predetermined direction.

11. The machine of claim 1, wherein said punching assembly includes a plurality of male and female die members, said control means is adapted to individually control the relative movement of each male die member and its respective female die member with respect to the winding assembly.

12. The machine of claim 11, including selection means to cause selective actuation of at least one of the male die/s.

13. The machine of claim 12, including selection control means to co-ordinate said selection means with said rotation of said shaft.

14. The machine of claim 13, wherein the winding drive means includes a ratchet wheel to drive said shaft, a pawl reciprocated and engageable with said ratchet wheel to cause intermittent rotation thereof, and means to limit said shaft to rotate only in a winding direction.

15. The machine of claim 1, wherein said abutment means is located to engage the roll adjacent the position of application of the strip to the roll.

* * * * *